United States Patent [19]
Barazani

[11] Patent Number: 5,833,403
[45] Date of Patent: Nov. 10, 1998

[54] CUTTING TOOL ASSEMBLY HAVING AN EXCHANGEABLE ADAPTOR

[75] Inventor: Gideon Barazani, Kiryat Bialik, Israel

[73] Assignee: Iscar Ltd., Migdal Tefen, Israel

[21] Appl. No.: 712,533

[22] Filed: Sep. 11, 1996

[30] Foreign Application Priority Data

Oct. 6, 1995 [IL] Israel .......................................... 115544

[51] Int. Cl.⁶ .................................................. B23B 29/04
[52] U.S. Cl. ........................... 407/101; 407/109; 407/110
[58] Field of Search ................................ 407/11, 66, 101, 407/110; 47/109

[56] References Cited

U.S. PATENT DOCUMENTS

| | | | |
|---|---|---|---|
| 4,332,513 | 6/1982 | Gowanlock . | |
| 4,695,208 | 9/1987 | Yankoff | 407/11 X |
| 4,887,945 | 12/1989 | Pano | 407/110 |
| 4,938,640 | 7/1990 | Pano et al. | 407/110 |
| 4,938,641 | 7/1990 | Maier . | |
| 5,112,164 | 5/1992 | Pano | 407/110 |
| 5,388,487 | 2/1995 | Danielsen | 407/11 X |
| 5,516,241 | 5/1996 | Plutschuck et al. | 407/110 |

FOREIGN PATENT DOCUMENTS

| | | |
|---|---|---|
| 989133 | 4/1965 | United Kingdom . |
| WO 94/21408 | 9/1994 | WIPO . |

Primary Examiner—A. L. Pitts
Assistant Examiner—Henry W. H. Tsai
Attorney, Agent, or Firm—Pennie & Edmonds LLP

[57] ABSTRACT

A cutting tool assembly comprises a tool shank having a shank holding portion and an exchangeable adaptor. The adaptor has an adaptor mounting portion to be secured to the shank holding portion with clamping means, and an insert retaining portion for retaining a replaceable cutting insert, the insert retaining portion projecting outwardly from the adaptor mounting portion. The adaptor mounting portion has a side wall formed with a protrusion which has a protrusion abutting surface substantially parallel to the side wall. The shank holding portion has a face surface generally parallel to the side wall of the adaptor mounting portion and formed with a recess mating with and capable of receiving the protrusion of the adaptor mounting portion. The clamping means comprises an adaptor through bore formed adjacent a rear end of the adaptor and passing through the protrusion, a threaded bore formed in the shank holding portion and aligned with the adaptor through bore, and a clamping screw. The rear end of the adaptor is formed with a transverse slit merging with the adaptor through bore, and at least a portion of the through bore, which is disposed in the protrusion, tapers in the direction towards the protrusion abutting surface of the adaptor mounting portion, the screw head portion being capable of bearing against the tapered portion of the through bore.

22 Claims, 4 Drawing Sheets

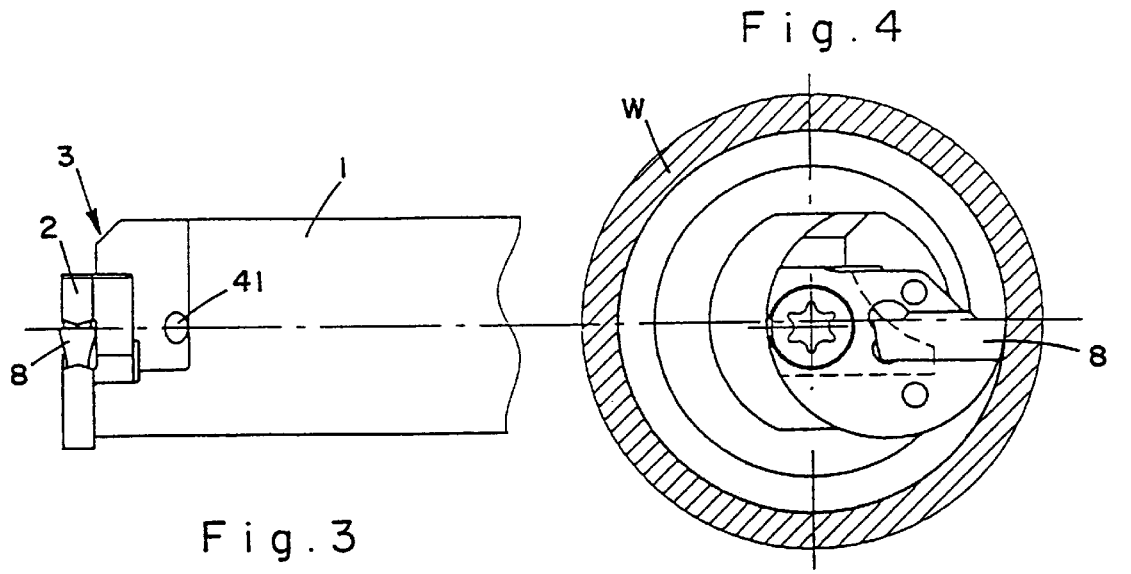
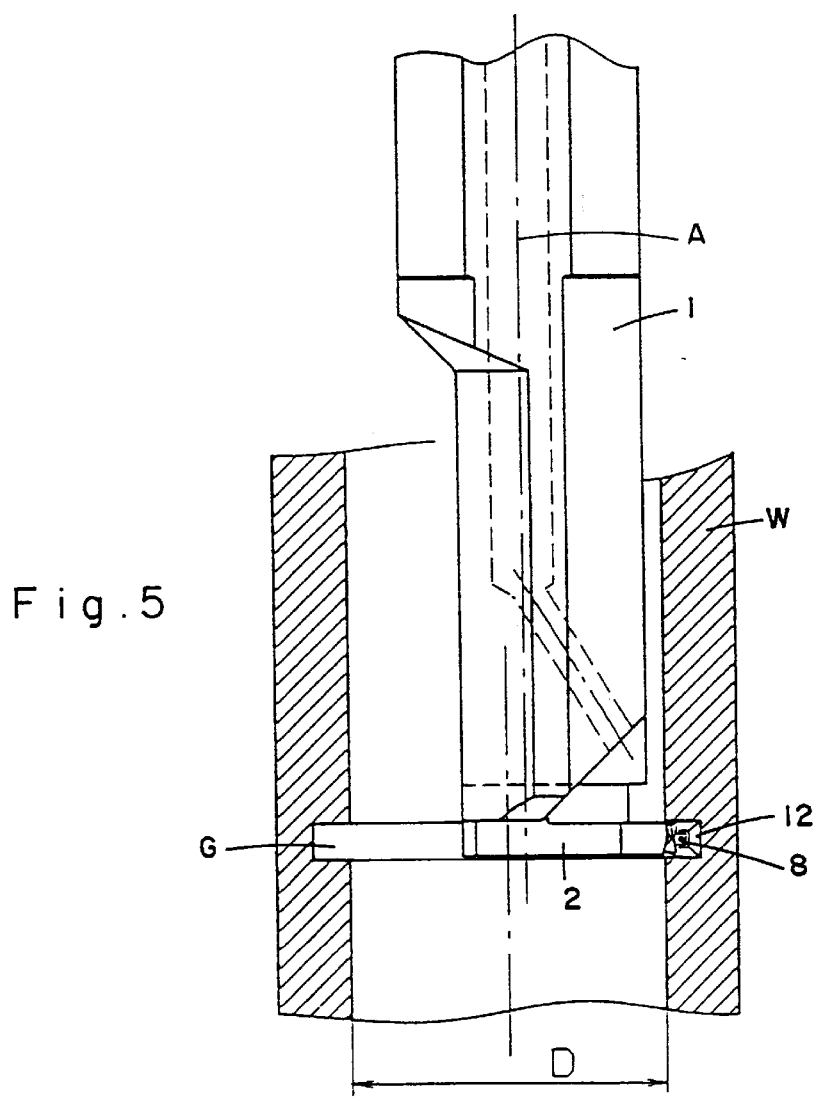

CUTTING TOOL ASSEMBLY HAVING AN EXCHANGEABLE ADAPTOR

FIELD OF THE INVENTION

The present invention relates to a cutting tool assembly consisting of a tool shank and an exchangeable adaptor for holding a replaceable cutting insert, releasably secured thereto.

BACKGROUND OF THE INVENTION

Such cutting tools are used for different cutting operations and, in particular, for internal turning, threading, grooving and recess cutting operations in which the cutting insert projects outwardly from the adaptor, the extent of the such projection defining the cutting depth of the operation.

In the cutting tool assemblies of the specified kind, which are disclosed, for example, in WO 94/21408, U.S. Pat. No. 4,332,513 and U.S. Pat. No. 4,938,641, the adaptor is usually substantially planar and has an insert retaining portion formed with an insert receiving slot for holding the cutting insert and an adaptor mounting portion serving to couple the adaptor with the tool shank. The adaptor mounting portion and the tool shank have cooperating surfaces formed, respectively, with a recess and a protrusion which protrusion mates with the recess and is adapted to be received therein. The adaptor is secured to the tool shank by means of two or more fastening screws, the accommodation of which screws requires a sufficient transverse dimension for the adaptor mounting portion. Such a design does not suit for machining deep grooves having small diameters. In addition, the manner in which the cooperating surfaces of these assemblies interact requires small manufacturing tolerances and, sometimes, a predetermined sequence of screw insertion and, therefore, its handling is not simple.

When, within workpieces having small diameters, a radial internal machining of deep and narrow grooves is required, design of a cutting tool assembly of the above kind is still more restricted by the fact that the adaptor has to be secured to a end face of the tool shank transversely to an axis thereof. In consequence with such an arrangement and in view of a substantially small diameter of the tool shank, the area for the securing of the adaptor is essentially limited and it is, therefore, clearly desirable to reduce the number of fastening screws used in the assembly.

An example of a cutting tool assembly where only one fastening screw is used is a Stechsystem 2000 manufactured by Zinner GmbH. However, to ensure stable securing of this tool assembly to an end face of its tool shank, the latter is formed with detent pins which are received within the corresponding through bores of the adaptor. Such an arrangement needs high manufacturing accuracy and still requires sufficient area of the end face of the tool shank, rendering thereby the use of this arrangement for cutting tools having small diameters essentially limited.

It is the object of the present invention to provide a cutting tool in which a reliable and stable securing of an exchangeable adaptor to a tool shank is achieved by means of a single clamping screw and in a manner allowing for an effective miniaturization of the cutting tool, whereby an internal machining of deep and narrow grooves within workpieces having small diameters is facilitated.

SUMMARY OF THE INVENTION

In accordance with the present invention there is provided a cutting tool assembly comprising a tool shank having a shank holding portion and an exchangeable adaptor having an adaptor mounting portion to be secured to the shank holding portion with clamping means, and an insert retaining portion for retaining a replaceable cutting insert, the insert retaining portion projecting outwardly from the adaptor mounting portion;

said adaptor mounting portion having a side wall formed with a protrusion which has a protrusion abutting surface substantially parallel to the side wall, and opposite upper and lower protrusion retaining surfaces oriented transversely to the protrusion abutting surface;

said shank holding portion having a face surface generally parallel to the side wall of the adaptor mounting portion and formed with a recess mating with and capable of receiving the protrusion of the adaptor mounting portion, the recess having a recess abutment surface and opposite upper and lower recess retaining surfaces adapted to interact with the corresponding surfaces of the protrusion;

said clamping means comprising an adaptor through bore formed adjacent a rear end of the adaptor and passing through the protrusion, a threaded bore formed in the shank holding portion and aligned with the adaptor through bore, and a clamping screw having a screw head portion receivable within the adaptor through bore and a screw threaded portion adapted for being screwed into the threaded bore;

characterized in that said rear end of the adaptor is formed with a transverse slit merging with the adaptor through bore, and at least a portion of said through bore, which is disposed in said protrusion, tapers in the direction towards said protrusion abutting surface of the adaptor mounting portion, said screw head portion being capable of bearing against the tapered portion of the through bore.

With such a design, upon the clamping screw being screwed in the threaded bore, its head portion, which is preferably of a conical shape, bears against the tapered portion of the through bore, thereby forcibly biasing an upper portion of the adaptor mounting portion away from a lower portion thereof within the recess of the shank holding portion until the upper and lower protrusion retaining surfaces bear against corresponding upper and lower recess retaining surfaces at contact areas thereof disposed above and below the clamping screw head portion. Simultaneously, the adaptor is rotated in the direction of the applied torque causing the lower protrusion retaining surface to bear against the lower recess retaining surface at a contact area thereof remote from the screw. At the same time, the protrusion abutting surface of the adaptor mounting portion abuts the recess abutment surface of the shank holding portion.

In a preferred embodiment of the present invention, the tapered portion of the adaptor through bore has a substantially circular cross-sectional shape. However, the cross-sectional shape of the tapered portion may be non-circular, e.g. it may be elongated and have a maximal dimension in the direction substantially along the adaptor length, thereby facilitating the flexibility of an upper portion of the adaptor mounting portion at a region thereof adjacent the insert retaining portion, and a minimal dimension in the transverse direction, whereby predetermined locations of contact between the clamping screw head and the tapered portion of the through bore is ensured.

Preferably, the upper retaining surfaces of the protrusion and the recess are shorter than respective lower retaining surfaces thereof in the direction along the adaptor length away from the through bore. It is still more preferable that said protrusion is formed with a concave cut-out adjacent the insert retaining portion.

Preferably, the direction in which the clamping screw is screwed is such as to provide a torque rotating the adaptor in the same direction as the torque generated by cutting forces acting on the cutting insert retained in the insert retaining portion of the adaptor.

Preferably, at least one of the abutment and abutting surfaces of the recess and the protrusion is formed with a relatively shallow demarcation recess to ensure that a contact between these surfaces occurs at an upper area thereof. It is preferable in this case that the side wall of the adaptor mounting portion and the face surface of the shank holding portion have an additional area of contact, i.e. an additional abutment area, spaced from said recess and protrusion.

Preferably, the additional area of contact is substantially parallel to the recess abutment and protrusion abutting surfaces and is established between the lowermost portions of the face surface of the shank holding portion and side wall of the adaptor mounting portion.

In a preferred embodiment of the present invention, the tool shank, at least adjacent a leading end thereof, is of a cylindrical shape and the adaptor has a partially circular circumference conforming therewith and is oriented transversely with respect to the tool shank. Alternatively, the tool shank may be of a non-circular cross-section and have a height greater than the width thereof.

Preferably, the face surface of the tool shank is formed with two oppositely disposed upper and lower lateral flange portions defining therebetween said recess.

Preferably, the leading end of the tool shank is formed with a cut-out to provide, adjacent the insert retaining portion, a space for the chip flow.

Preferably, the tool shank has an internal coolant fluid duct having a fluid outlet located in the cut-out formed in the leading end of the tool shank.

BRIEF DESCRIPTION OF DRAWINGS

FIG. 3 is a side view of the cutting tool assembly shown in FIG. 2;

FIGS. 4 and 5 schematically illustrate a disposition of the cutting tool assembly shown in FIG. 2 in a workpiece during an internal grooving operation;

DESCRIPTION OF PREFERRED EMBODIMENTS

Figure 1:
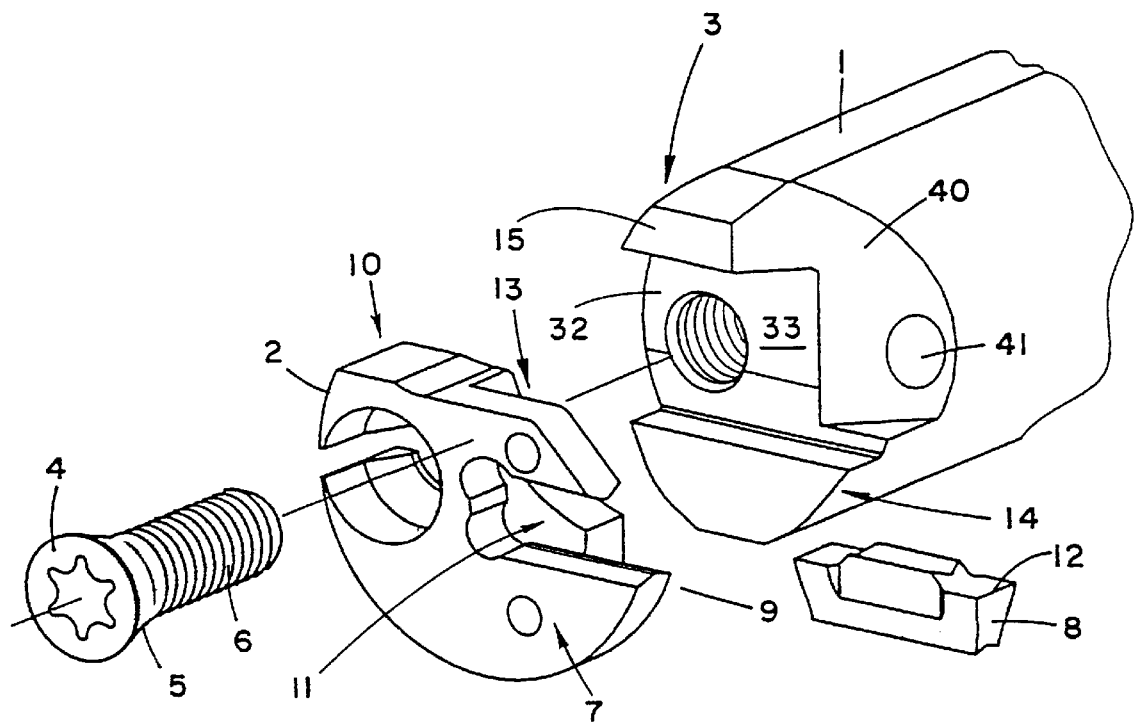
FIG. 1 is an exploded isometric view of a metal cutting tool assembly according to the present invention.
Figure 2:
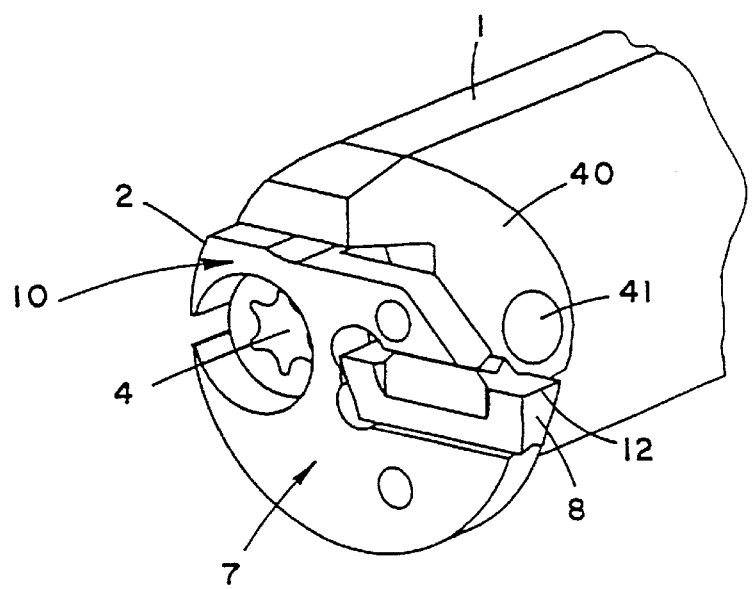
FIG. 2 is an isometric view of the cutting tool assembly shown in FIG. 1.

A metal cutting tool assembly, according to the present invention, is shown in FIGS. 1, 2 and 3. FIGS. 4 and 5 illustrate the use of this metal cutting tool for internal machining, in particular for radial machining of a narrow groove G in a workpiece W having a small diameter D, which rotates relatively to the tool around an axis A.

As seen in FIGS. 1 and 2, the metal cutting tool assembly comprises an elongated cylindrical tool shank 1 and an exchangeable, substantially planar adaptor 2 of a partially circular shape, oriented transversely with respect to the tool shank 1 and screw clamped to a leading end 3 thereof by a clamping screw 4 having a conical head portion 5 and a threaded portion 6.

Figures 6, 7:
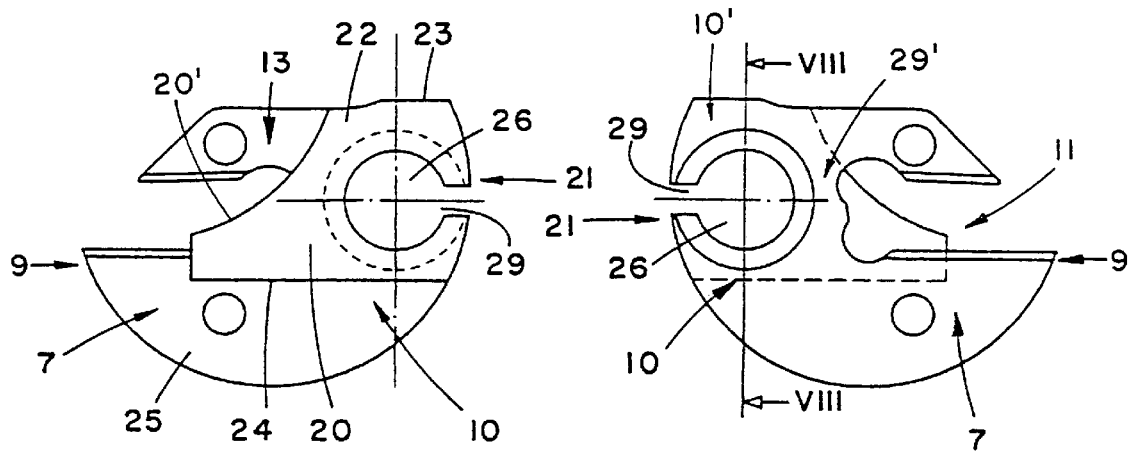
FIG. 6 is a face view of an adaptor of the cutting tool assembly shown in FIGS. 1 and 2.
FIG. 7 is a back view of the adaptor shown in FIG. 6.

As seen in FIGS. 1 and 2 and also shown in FIGS. 6 and 7 illustrating the adaptor 2, the latter has an insert retaining portion 7 of a blade-like type, for holding a replaceable cutting insert 8 with its operational cutting portion projecting outwardly from a leading end 9 of the adaptor 2, and an adaptor mounting portion 10. The insert retaining portion 7 of the adaptor 2 is formed with an insert receiving slot 11 in which the cutting insert 8 is retained so that, during the cutting operation (FIG. 5), a cutting edge 12 thereof and the above-mentioned axis A are disposed substantially in one plane. The adaptor mounting portion 10 has a side wall 13 facing the tool shank 1 and oriented substantially transversely to the cutting edge 12 of the cutting insert 8.

As seen in FIG. 7, the side wall 13 of the adaptor mounting portion 10 is formed with a protrusion 20 disposed at an upper portion of the side wall 13 and extending from a rear end 21 of the adaptor 2 towards the leading end 9 of the adaptor. As better seen in FIG. 8, the protrusion 20 has an abutting surface 22 and upper and lower retaining surfaces 23 and 24 substantially normal to the abutting surface 22. As seen in FIG. 7, the upper surface 23 of the protrusion 20 has a dimension, in the direction of the insert retaining portion 7, substantially less than the lower surface 24. Such a design enables the protrusion to be formed with a concave cut-out 20' adjacent the insert retaining portion 7, due to which more space is provided, during a cutting operation, for chip flow and passage of coolant. A lower portion of the side wall 13 constitutes an additional abutting surface 25 thereof.

Figure 8:
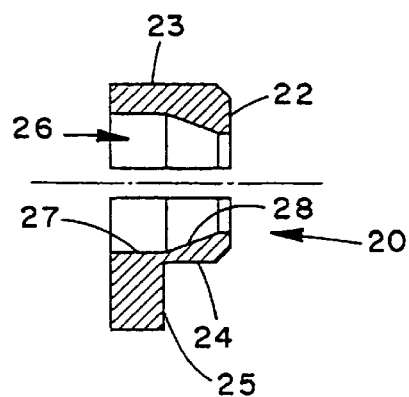
FIG. 8 is a cross-sectional view along the line VIII—VIII of the adaptor shown in FIG. 6.

As seen in FIGS. 6 and 7, the adaptor mounting portion 10 is formed with a through bore 26 disposed adjacent the rear end 21 of the adaptor 2. It is shown in FIG. 8 that the through bore 26 is, preferably, of a stepped configuration and has a cylindrical portion 27 of a diameter larger than that of the head portion 5 of the clamping screw 4 and a tapered portion 28 substantially corresponding to the shape of the conical head portion 5, most or all of the tapered portion 28 of the through bore being accommodated in the region of the protrusion 20. An included angle of the tapered portions of the through bore 26 and the screw head portion 5 is preferably in the range of 30° to 80°, for example 50°.

Figure 6A:
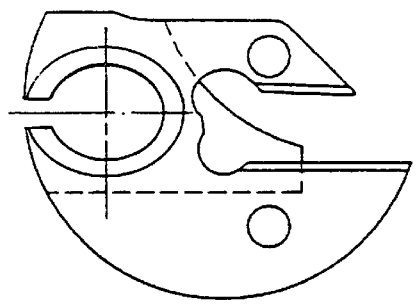
FIG. 6a is a face view of an adaptor of a cutting tool assembly according to the present invention, having an alternative design.

It should be specifically mentioned that the cross-sectional shape of the tapered portion of the adaptor through bore may be other than circular. For example, it may be elongated so that it has a maximal dimension in the direction along the adaptor length and a minimal dimension in the direction substantially perpendicular to the upper and lower retaining surfaces. Thus, as for example shown in FIG. 6a, the tapered through bore may have a substantially oval cross-section. The profile of the tapered portion of the through bore along the axis thereof should not necessarily be conical but may rather have any other suitable shape to ensure that the head portion of the clamping screw bears against the surface of the tapered portion at predetermined locations thereof along the axis of the bore. Thus, for example, the profile of the tapered portion may be curved in a manner similar to that defined in ISO/DIS 6987 in connection with a fixation hole of indexable inserts. Alternatively, all the above may be achieved by a suitable shape of the head portion of the clamping screw.

As seen in FIGS. 6 and 7, the rear end 21 of the adaptor 2 is formed with a transverse slit 29 merging with and extending along the through bore 26. Such a design combined with a substantially large diameter of the through bore 26 one region of which is disposed in the vicinity of the concave cut-out 20' of the protrusion 20 and adjacent the insert receiving slot 11, results in a relatively narrow flexible region 29' which is disposed generally opposite the slit 29 and which allows an upper portion 10' of the adaptor mounting portion 10 to be flexibly displaced with respect to a lower portion thereof.

As seen in FIG. 1, the tool shank 1 has, at the leading end 3 thereof, a shank holding portion 14 with a face surface 15 mating the side surface 13 of the adaptor mounting portion and cooperating therewith in a male-female fashion.

Figure 9:
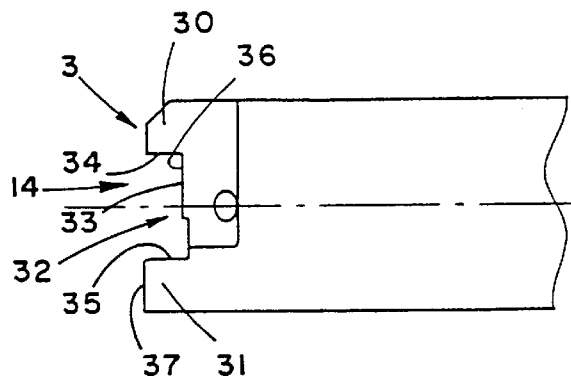
FIG. 9 is a side view of a tool shank of the cutting tool assembly shown in FIGS. 1 and 2.
Figure 10:
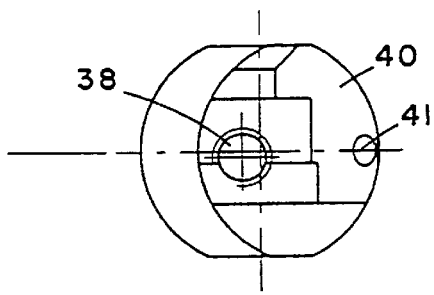
FIG. 10 is a face view of the tool shank shown in FIG. 9.

As shown in FIGS. 9 and 10, the shank holding portion 14 is formed with two laterally disposed upper and lower flange portions 30 and 31 which define therebetween a recess 32 mating the shape of the protrusion 20 and adapted to receive the latter. Thus, the recess 32 has a substantially centrally disposed abutment surface 33 having a stepped configuration, and upper and lower retaining surfaces 34 and 35 of the respective upper and lower flange portions 30 and 31 of the shank holding portion 14. Due to the stepped configuration of the abutment surface 33, it is ensured that its contact with the abutting surface 22 of the adaptor mounting portion 10 occurs at a predetermined location, particularly at an upper portion 36 thereof. A planar end face 37 of the lower flange portion 31 is parallel to the abutment surface 33 and constitutes an additional abutment surface of the shank holding portion.

As seen in FIG. 10, the shank holding portion 14 is formed with a threaded bore 38 adapted to be generally aligned with the adaptor through bore 26 and to cooperate with the threaded portion 6 of the clamping screw 4.

As shown in FIG. 10 but better seen in FIGS. 1 and 2, the leading end 3 of the tool shank is formed with a cut-out 40 providing, adjacent the insert retaining portion 7, a space for the chip flow. The tool shank 1, preferably, has an internal coolant fluid duct (not shown) having a fluid outlet 41 which is located in the cut-out 40. Such a construction enables a supply of coolant fluid to a cutting area, due to which effective cooling of the cutting insert and evacuation of chips from the cutting area can be achieved, which is especially advantageous for machining of deep grooves and/or recesses within holes of small diameters.

Figure 12:
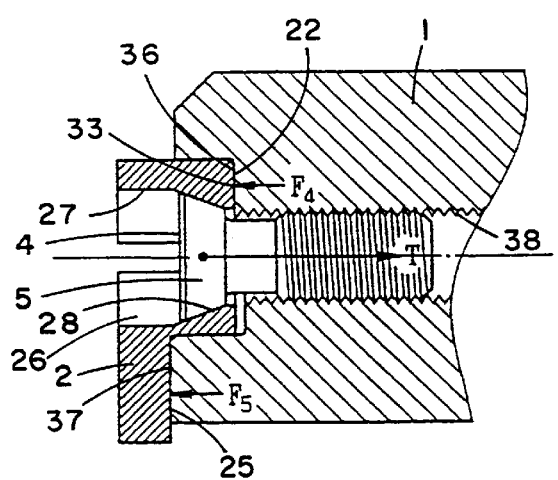
FIG. 12 is a cross-sectional view along the stepped line XII—XII of the cutting tool assembly shown in FIG. 11.
Figure 11:
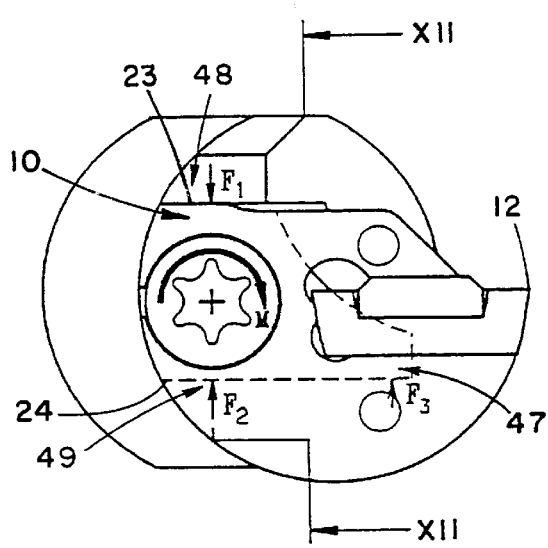
FIG. 11 is a face view of the cutting tool assembly, schematically illustrating a clamping mechanism of the cutting tool assembly shown in FIG. 2.

With reference to FIGS. 11 and 12, the clamping mechanism of coupling of the adaptor 2 to the tool shank 1 will now be described. With the protrusion 20 of the adaptor being introduced in the recess 32 of the tool shank, the clamping is performed by the clamping screw 4 being inserted into the through bore 26 of the adaptor mounting portion and screwed, with its threaded portion 6, in the threaded bore 38 of the shank holding portion. With the screw being tightened with a torque M, a tension force T exerted thereby ensures that the abutting surfaces 22 and 25 of the adaptor mounting portion contact with the abutment surfaces 33 and 37 of the shank holding portion (FIG. 12). The tension force T also causes biasing of the conical screw head 5 inwardly with its consequent bearing against the tapered portion 28 of the through bore 26 which results in the protrusion 20 of the adaptor mounting portion being spread within the recess 32 so that the upper and lower retaining surfaces 23 and 24 (FIG. 11) of the protrusion bear against the upper and lower retaining surfaces 34 and 35 of the recess. This removes any gaps between these cooperating surfaces and leads to a frictional interaction therebetween, during application of cutting forces. The torque M applied when the adaptor is secured to the tool shank and cutting forces applied during operation tend to rotate the adaptor mounting portion (FIG. 11) until the lower retaining surface 24 of the protrusion contacts the lower retaining surface 35 of the recess at an area 47 thereof innermost with respect to the cutting edge 12.

Thus, with the specific design of the tool cutting assembly according to the present invention, the above clamping mechanism is effected by the use of the single clamping screw 4. This clamping screw 4 alone provides for the exertion of main forces required for clamping, namely: forces F1 and F2 shown in FIG. 11, which are the reaction forces resulting from the mutual abutment of the pairs 23–34 and 24–35 of the respective upper and lower retaining surfaces at their contact regions 48 and 49; force F3 shown in FIG. 11, which is a direct reaction force exerted, at the contact area 47, between the lower retaining surfaces 24 and 35 of the protrusion and the recess; and forces F4 and F5, shown in FIG. 12, which are direct reaction forces resulting from the contact between the pairs 22–33 and 25–37 of the respective abutting and abutment surfaces of the adaptor mounting portion and the shank holding portion.

The fact that the assembly needs only one clamping screw allows, on the one hand, for relatively large diameters of the screw and the adaptor through bore which is specifically advantageous for the exertion of the clamping forces of required values and, on the other hand, for a considerable miniaturization of the tool, specifically important for such cutting operations as illustrated in FIGS. 4 and 5. The coupling between the adaptor and the tool shank, produced according to the present invention, is sufficiently stable and reliable, with the construction being simple, user friendly and having an advantageously limited number of elements which do not require extremely high dimensional tolerances.

It should be mentioned that the cutting tool assembly may be designed with features different from that described above and shown in the drawings. Thus, to ensure a predetermined location of contact between the abutting and abutment surfaces of the protrusion and the recess, the abutting surface of the protrusion, rather than of the recess, may have an appropriate, e.g. stepped, configuration. The adaptor may be attached to a side of the tool shank to be disposed along the longitudinal axis of the tool rather than transversely thereto. The tool shank may have rectangular shape rather than being cylindrical. A rear portion of the tool shank may have different design according to the application of the cutting tool. Thus, for example, it may be designed for use in an automatic tool changing system (ATC).

Though the clamping mechanism of the present invention is specifically advantageous for cutting tool assemblies in which the insert retaining portion of the adaptor is of a blade type with the insert receiving pocket being in the form of a slot in which the cutting insert is clamped by a flexible spring element integral with the insert retaining portion, such as shown in the drawings, the present invention is not limited to such applications and can be used in cutting tools where a cutting insert is secured in another manner, e.g by wedge clamping.

I claim:

1. A cutting tool assembly comprising a tool shank having a shank holding portion and an exchangeable adaptor having an adaptor mounting portion to be secured to the shank holding portion with clamping means, and an insert retaining portion for retaining a replaceable cutting insert, the insert retaining portion projecting outwardly from the adaptor mounting portion;

said adaptor mounting portion having a side wall formed with a protrusion which has a protrusion abutting surface substantially parallel to the side wall, and opposite upper and lower protrusion retaining surfaces oriented transversely to the protrusion abutting surface;

said shank holding portion having a face surface generally parallel to the side wall of the adaptor mounting portion and formed with a recess mating with and capable of receiving the protrusion of the adaptor mounting portion, the recess having a recess abutment surface and opposite upper and lower recess retaining surfaces adapted to interact with the corresponding surfaces of the protrusion;

said clamping means comprising an adaptor through bore formed adjacent a rear end of the adaptor and passing through the protrusion, a threaded bore formed in the shank holding portion and aligned with the adaptor through bore, and a clamping screw having a screw head portion receivable within the adaptor through bore and a screw thread portion adapted for being screwed into the threaded bore;

said rear end of the adaptor being formed with a transverse slit merging with the adaptor through bore at least a portion of said through bore tapering in the direction towards said protrusion abutting surface of the adaptor mounting portion, said portion of the through bore being disposed in said protrusion, said screw head portion being capable of bearing against the tapered portion of the through bore.

2. A cutting tool assembly according to claim 1, wherein the direction in which the clamping screw is screwed is such as to provide a torque rotating the adaptor in the same direction as the torque generated by cutting forces acting on the cutting insert retained in the insert retaining portion of the adaptor.

3. A cutting tool assembly according to claim 1, wherein the upper retaining surfaces of the protrusion and the recess are shorter than respective lower retaining surfaces thereof in the direction along the adaptor length away from the through bore.

4. A cutting tool assembly according to claim 3, wherein said protrusion has a concave cut-out adjacent the insert retaining portion.

5. A cutting tool assembly according to claim 1, wherein at least one of the abutment and abutting surfaces of the recess and the protrusion is formed with a relatively shallow demarcation recess to ensure that a contact between said surfaces occurs at an upper area thereof, said side wall of the adaptor mounting portion and said face surface of the shank holding portion having an additional area of contact spaced from said recess and protrusion.

6. A cutting tool assembly according to claim 5, wherein said additional area of contact is substantially parallel to the recess abutment and protrusion abutting surfaces and is established between the lowermost portions of the face surface of the shank holding portion and side wall of the adaptor mounting portion.

7. A cutting tool assembly according to claim 1, wherein said tapered portion of the adaptor through bore has a substantially circular cross-sectional shape.

8. A cutting tool assembly according to claim 1, wherein the cross-sectional shape of said tapered portion is non-circular.

9. A cutting tool assembly according to claim 8, wherein said through bore has a maximal cross-sectional dimension substantially in the direction along the adaptor length and a minimal cross-sectional dimension in the transverse direction.

10. A cutting tool assembly according to claim 1, wherein the tool shank, at least adjacent a leading end thereof, is of a cylindrical shape and the adaptor has a partially circular circumference conforming therewith and is oriented transversely with respect to the tool shank.

11. A cutting tool assembly according to claim 1, wherein said face surface of the tool shank is formed with two oppositely disposed upper and lower lateral flange portions defining therebetween said recess.

12. A cutting tool assembly according to claim 1, wherein a leading end of the tool shank is formed with a cut-out to provide, adjacent the insert retaining portion, a space for chip flow.

13. A cutting tool assembly according to claim 12, wherein the tool shank has an internal coolant fluid duct having a fluid outlet located in said cut-out formed in the leading end of the tool shank.

14. A cutting tool assembly according to claim 1, wherein said upper and lower retaining surfaces of said protrusion extend to a rear end wall of the adaptor and are oriented transversely to said rear end wall, said adaptor through bore being formed adjacent said rear end wall between said upper and lower retaining surfaces, said transverse slit being formed in said rear end wall of the adaptor.

15. A cutting tool assembly according to claim 1, wherein a single clamping screw is used to secure the adaptor mounting portion to the shank holding portion.

16. A cutting tool assembly according to claim 1, wherein said clamping screw is of a substantially large diameter relative to a distance between said upper and lower protrusion retaining surfaces, and said tapered portion of through bore occupies a major part of said distance.

17. A cutting tool assembly comprising a tool shank which has a cylindrical shape at least adjacent a leading end thereof and which has a shank holding portion, and an exchangeable adaptor oriented transversely with respect to the tool shank and having a partially circular circumference conforming with the cylindrical shape thereof, said adaptor having an adaptor mounting portion to be secured to the shank holding portion with clamping means, and an insert retaining portion for retaining a replaceable cutting insert, the insert retaining portion projecting outwardly from the adaptor mounting portion;

said adaptor mounting portion having a side wall formed with a protrusion which has a protrusion abutting surface substantially parallel to the side wall, and opposite upper and lower protrusion retaining surfaces oriented transversely to the protrusion abutting surface;

said shank holding portion having a face surface generally parallel to the side wall of the adaptor mounting portion and formed with a recess mating with and capable of receiving the protrusion of the adaptor mounting portion, the recess having a recess abutment surface and opposite upper and lower recess retaining surfaces adapted to interact with the corresponding surfaces of the protrusion;

said clamping means comprising an adaptor through bore formed adjacent a rear end of the adaptor and passing through the protrusion, a threaded bore formed in the shank holding portion and aligned with the adaptor through bore, and a clamping screw having a screw head portion receivable within the adaptor through bore and a screw thread portion adapted for being screwed into the threaded bore;

said rear end of the adaptor is formed with a transverse slit merging with the adaptor through bore, and at least a portion of said through bore, which is disposed in said protrusion, tapers in the direction towards said protrusion abutting surface of the adaptor mounting portion, said screw head portion being capable of bearing against the tapered portion of the through bore.

18. A cutting tool assembly comprising a tool shank having a shank holding portion and an exchangeable adaptor having an adaptor mounting portion to be secured to the shank holding portion with clamping means, and an insert retaining portion for retaining a replaceable cutting insert, the insert retaining portion projecting outwardly from the adaptor mounting portion;

said adaptor mounting portion having a side wall formed with a protrusion which has a protrusion abutting surface and opposite upper and lower protrusion retaining surfaces;

said shank holding portion having a face surface formed with a recess mating with and capable of receiving the protrusion of the adaptor mounting portion, the recess having a recess abutment surface and opposite upper and lower recess retaining surfaces adapted to interact with the corresponding surfaces of the protrusion; and said clamping means comprising an adaptor through bore formed adjacent a rear end of the adaptor and passing through the protrusion, a threaded bore formed in the shank holding portion and aligned with the adaptor through bore, and a clamping screw having a screw head portion receivable within the adaptor through bore and a screw thread portion adapted for being screwed into the threaded bore; and wherein said adaptor is provided with a transverse slit which merges with said adaptor through bore, the transverse slit passing between said opposite upper and lower protrusion retaining surfaces which interact with said opposite upper and lower recess retaining surfaces, when the adaptor is received into the recess of the shank holding portion.

19. The cutting tool assembly of claim 18, wherein said adaptor through bore has a tapering portion disposed in the protrusion of the adaptor.

20. The cutting tool assembly of claim 18, wherein a single clamping screw is used to secure the adaptor mounting portion to the shank holding portion.

21. The cutting tool assembly of claim 18, wherein said threaded bore in the shank holding portion and said adaptor through bore are substantially parallel to a longitudinal axis of the tool shank.

22. The cutting tool assembly of claim 18, wherein the adaptor is oriented transversely with respect to a longitudinal axis of said tool shank, and a cutting edge of the replaceable cutting insert is oriented substantially parallel to said longitudinal axis.

* * * * *